United States Patent [19]

Krampe et al.

[11] Patent Number: 5,060,611
[45] Date of Patent: Oct. 29, 1991

[54] PROCESS AND DEVICE FOR INFLUENCING THE AIR FEED IN AN INTERNAL-COMBUSTION ENGINE, IN PARTICULAR DURING IDLING AND COASTING

[75] Inventors: Wolfgang Krampe, Renningen; Günter Braun, Bietigheim-Bissingen; Helmut Janetzke, Schwieberdingen, all of Fed. Rep. of Germany

[73] Assignee: Robert Bosch GmbH, Stuttgart, Fed. Rep. of Germany

[21] Appl. No.: 593,481

[22] PCT Filed: Nov. 23, 1988

[86] PCT No.: PCT/DE88/00745

§ 371 Date: Aug. 10, 1989

§ 102(e) Date: Aug. 10, 1989

[87] PCT Pub. No.: WO89/05905

PCT Pub. Date: Jun. 29, 1989

Related U.S. Application Data

[63] Continuation of Ser. No. 397,495, Aug. 10, 1989, abandoned.

[30] Foreign Application Priority Data

Dec. 24, 1987 [DE] Fed. Rep. of Germany ....... 3744222

[51] Int. Cl.[5] ............................................. F02D 39/02
[52] U.S. Cl. .................................... 123/320; 123/339
[58] Field of Search ...................... 123/320, 339, 493; 364/431.04

[56] References Cited

U.S. PATENT DOCUMENTS

| | | | |
|---|---|---|---|
| Re. 32,030 | 11/1985 | Yano et al. | 364/431.04 |
| 4,359,982 | 11/1982 | Yoshioka et al. | 123/320 |
| 4,401,073 | 8/1983 | Furuhashi | 123/339 |
| 4,432,317 | 2/1984 | Kawamura | 123/339 |
| 4,481,923 | 11/1984 | Ozaki | 123/320 |
| 4,506,641 | 3/1985 | Hasegawa | 123/339 |
| 4,531,489 | 7/1985 | Sturdy | 123/320 |
| 4,729,354 | 3/1988 | Tominaga et al. | 123/320 |

*Primary Examiner*—Raymond A. Nelli
*Attorney, Agent, or Firm*—Michael J. Striker

[57] ABSTRACT

A process and a device for air proportioning during idling or overrun mode of operation in an internal-combustion engine are provided. During idling, the internal-combustion engine is regulated to a nominal speed by means of a PI controller (203, 204) and a preliminary air rate control value is determined as a function of temperature, gear position and air-conditioning state of the vehicle. At the same time, the actual air mass or air intake rate (60) is measured and the difference value of the actual air intake rate and the preliminary air-rate control value is stored in a store (304). During overrun, the air-mass throughput of the internal-combustion engine is regulated to this stored value. Furthermore, the control receives a series of auxiliary variables which make it easier to carry out the control as a function of the particular operating mode.

23 Claims, 3 Drawing Sheets

PROCESS AND DEVICE FOR INFLUENCING THE AIR FEED IN AN INTERNAL-COMBUSTION ENGINE, IN PARTICULAR DURING IDLING AND COASTING

This application is a continuation of application Ser. No. 397,495, filed Aug. 10, 1989, now abandoned.

BACKGROUND OF THE INVENTION

The invention relates to a process and a device for influencing preferably during idling and overrun mode of operation the air proportioning in an internal-combustion engine, provided with at least a speed detection and an engine power actuating member. Such a process and device for influencing the air proportioning in an internal-combustion engine are known from DE-OS 3,222,363. This publication describes a speed control preferably for the idling speed of an internal-combustion engine with an engine state controller, to which the engine speed, the nominal speed and a load signal P are fed for evaluation. The speed and the load signal are taken into account in negative-feedback proportional branches and a load signal is additionally taken into account in a branch with a delayed positive feedback. Thus, both stationary states and transitional states of the internal-combustion engine under changing loads and changing operating modes are regulated. However, this controller alone is not yet capable of compensating tolerances of the engine power actuating or adjusting member. The above-described arrangement with speed control of an internal-combustion engine was therefore followed by a device for adapting the characteristic curve of the actuating member, as is described, for example in DE-OS 3,415,183. This regulating device so described involves a relatively high outlay and contains two timing elements, and this can lead to problems with regard to engine-to-engine divergences, such as occur in mass production. Furthermore, in the process described, there is still no special provision for the engine braking or overrun mode of the motor vehicle. There is therefore the possibility that the engine will die during the transition from the overrun mode to "genuine" idling. A certain improvement is described in DE-OS 3,515,132. Here, the opening angle of the throttle flap required for idling is stored electronically, so that the throttle flap does not close any further during overrun than during idling. In this solution too, the control circuit again contains a timing element, and this can entail the problems already mentioned. Moreover, here, there is no correction of the overrun air rate in relation to varying operating parameters, such as, for example, an altitude condensation. Here too, therefore, it must still be expected that the engine will die under adverse conditions. Reference is also made to DE-OS 3,238,190 describing the detection of the suction pipe pressure.

SUMMARY OF THE INVENTION

An object of the invention is to overcome the above problems with a process and a device for influencing the air proportioning in an internal-combustion engine, especially during overrun mode of the kind mentioned above.

The invention achieves this object by means of a process in which during the idling mode of operation the engine speed is regulated to a nominal value, a value of air intake rate at the nominal speed is measured and stored and, during the overrun mode of operation, the intake air rate is adjusted according to the stored value. In addition to the improvement of the controller which now contains only one $T_1$ element, the correction of the altitude error by means of the engine braking or overrun air control via the stored basic air rate is of particular advantage. Even during a changing coil resistance of the idling adjuster, the air rate changing thereby is already compensated again during the overrun. Furthermore, in a trip which starts at a low altitude and is interrupted a high altitude, the changed characteristic of the adjuster is taken into account and the correct air rate set even before idling. Since the overrun air control is carried out by means of the same integrator which the speed control uses, smooth transitions are always obtained in the regulating variable. The integrator for learning the idling intake quantity or rate works at different speeds, in order to minimize, for example, the disturbing influence of the power-assisted steering and, on the other hand, make it possible to correct quickly a mismatching of the pilot on preliminary control with too high an intake air rate. Since in genuine idling, that is to say with a vehicle speed=0, no limitation of the air rate in the downward direction is effective, the engines, even when there are pronounced engine-to-engine divergences, can never run above the overrun-air characteristic control when the vehicle is stationary. If, during starting on an ascending gradient, the integrator of the idling speed control is brought to a very high value, the overrun-air controller cuts this high value smoothly back to the necessary amount of air required (starting aid without subsequent surging of the engine).

Further advantageous embodiments of the invention are contained in the subclaims and emerge in conjunction with the following description of the exemplary embodiment.

DRAWING

The invention is explained below by means of the exemplary embodiment illustrated in the drawings. In these, FIG. 1 shows a block circuit diagram of the electronic control system for regulating the overrun and idling mode of operation of the internal-combustion engine, FIG. 2 shows the acquisition of the air-rate pilot or preliminary control values, FIG. 3 shows the time curve of the air-conditioning system on-off signal, FIG. 4 explains the formation of the overrun-air addition in the overrun on off mode of operation, FIGS. 5A and 5B show the starter circuit of the manual-shift and automatic-transmission motor vehicle respectively, and finally FIG. 6 shows an overrun-air characteristic of the motor vehicle.

DESCRIPTION OF THE EXEMPLARY EMBODIMENT

Figure 1:
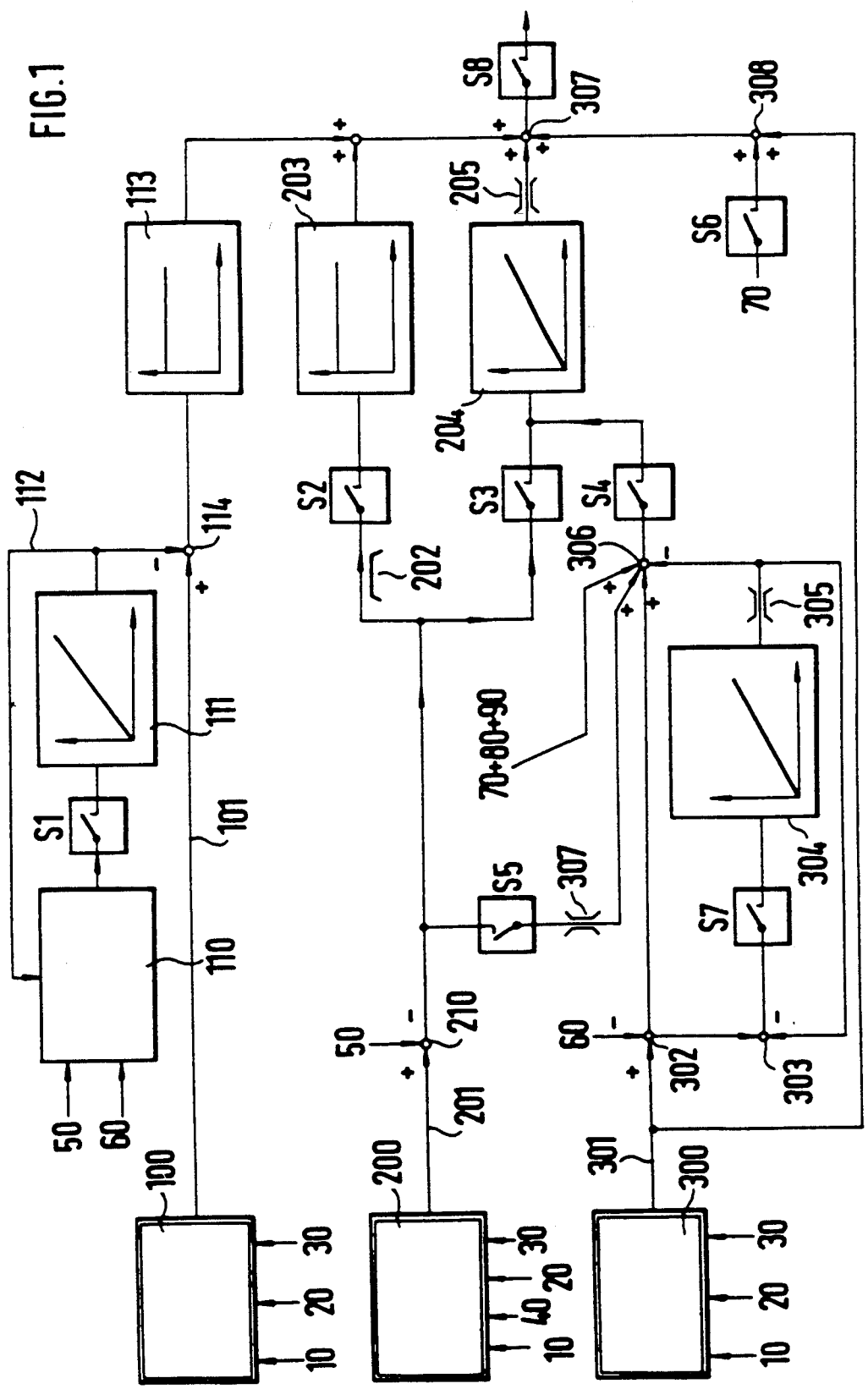

FIG. 1 shows a general diagram of the electronic control system for influencing the air proportioning in an internal-combustion engine. The three main branches of the control system are to be seen above one another. In the uppermost branch, a pilot or preliminary value 101 for the suction-pipe pressure is obtained in the suction-pipe pressure pilot or preliminary control 100 from the variables of temperature 10, drive signal 20 in automatic-transmission vehicles and air-conditioning system operating signal 30, Furthermore, an air balance is obtained in the computer 110 from the actual speed value 50, the actual-value signal for the air intake rate 60 and the calculated value 112 of the actual suction-pipe pressure. The result of the air-balance computer 110 is transmitted to the integrator 111 via the switch S1. The vehicle of the preferred exemplary embodiment has an initial idle travel position of the accelerator pedal which is utilized to actuate a microswitch. A further microswitch on the throttle flap indicates the closure. The switch S1 is closed for the pressure calculation when the idling microswitch on the accelerator pedal of the motor vehicle is closed and the vehicle speed is zero or, in vehicles with an automatic transmission, the selector lever is in the neutral position and at least one speed calculation has been made. The output of the integrator 111 thus represents the calculated actual suction-pipe pressure value 112. The difference between the suction-pipe pressure nominal pilot control value 101 and the calculated actual suction-pipe pressure value 112 is formed at the summing point 114 and fed to the proportion controller 113. The output signal of the controller 113, which acts as an engine state controller, is fed further, via the summing points 206 and 307, to the switch S8 of a control for the engine power adjusting member.

The second middle branch represents a speed control. A nominal speed value 201 is obtained in the engine-speed pilot or preliminary control 200 from the values of the temperature signal 10, overrun on off signal 40, drive signal in automatic transmission vehicles 20 and air-conditioning system operating signal 30. The actual speed signal 50 is subtracted from this signal at the summing point 210 and the difference is fed to the switches S2 and S3. A minimum-speed limiter 202 is also inserted before the switch S2. From the switch S2, the difference signal is fed further to the control for the power adjusting member via a proportion controller 203, the summing points 206 and 307 and the switch S8. Furthermore, the difference signal is fed to an integration controller 204 via the switch S3. The integration controller 204 is followed by a limiter stage 205, and thereupon the signal is likewise fed to the power adjusting member via the summing point 307 and the switch S8.

The third bottom most branch in FIG. 1 contains the overrun-air control. An air-rate pilot control value 301 is formed in the air-rate pilot or preliminary control 300 from the temperature signal 10, drive signal 20 in automatic-transmission vehicles and air-conditioning system operating signal 30. The air-rate pilot control value 301 is likewise fed directly to the switch S8 of the adjusting member control via the summing points 308 and 307. In this way, a speed-dependent signal 70 from an overrun-air characteristic can also be added at the point 308 to the air-rate pilot control value 301 via the switch S6. Furthermore, the air-rate pilot control value 301 is fed to the summing point 302. At the same time, the actual value of the air intake rate 60 is subtracted at the point 302. The difference thus determined is fed, on the one hand, to an integrator 304 via a further summing point 303 and the switch S7. The output of the integrator 304 is fed up to the summing point 303 via a limiter 305 of negative sign signals. Furthermore, the difference formed at the point 302 is fed to a summing point 306, to which the output value of the integrator 304 is also fed via the limiter circuit 305. In addition, the difference between the pilot control value for the nominal speed 201 and the actual speed 50 is fed to the point 306 via a switch S5 and the limiter circuit 309. Finally, the point 306 receives the speed-dependent value 70 via an overrun-air characteristic, plus a value 80 for the power-assisted steering during overrun mode, plus a nominal-value 90 for the overrun air control during overrun cut off.

In functional terms, the uppermost branch of the power adjusting member control is the pilot or preliminary control 100 for the suction-pipe pressure. The pilot control value 101 for the suction-pipe pressure is obtained from the parameters of temperature 10, gear position 20 and air-conditioning system operating signal 30. The actual suction-pipe pressure value 112 is obtained arithmetically from the measured quantities of engine speed 50 and air-rate throughput 60. The details of the uppermost branch, which are not essential for the invention claimed, are disclosed in DE-OS 3,238,190 incorporated herein by reference thereto. The difference between the suction-pipe nominal pilot control pressure 101 and the actual suction-pipe pressure 112 is fed to the adjusting-member control via a proportioning element 113, the summing point 307 and the switch S8.

The engine-speed negative feedback is activated during idling via the switch S2 and the proportioning element 203. That is to say, the switch S2 closes when the actual speed n has fallen below the nominal speed value and the accelerator-pedal microswitch is opened, that is to say the accelerator pedal is actuated and the speed of the vehicle is $v=0$ or, in automatic vehicles, the selector lever is set in drive. The switch S2 is also closed when the actual speed n has fallen below the nominal speed value and the accelerator-pedal microswitch is closed, that is to say the accelerator is in the position of rest and $v=0$ or, in an automatic-transmission vehicle, the selector lever is in the neutral position. The engine-speed integration controller 204 is activated via the switch S3 when the following four conditions are satisfied: starting is completed and the main throttle flap is closed and an inaction time, started when the main throttle flap closes, has elapsed; secondly, it a condition that the vehicle speed is $v=0$ in a non-automatic vehicle or, in an automatic vehicle, the selector lever is in the neutral position; thirdly, either the microswitch must be closed, that is to say the accelerator pedal is in the position of rest, or the microswitch is opened and consequently the accelerator pedal is actuated and the speed n is lower than the nominal speed. The fourth condition for the closing of the switch S3 is that the regulating variable of point 307 is lower than a predetermined maximum value ($TAU_{max}$) or the speed n is higher than the nominal speed. In genuine idling, therefore, the system is regulated to the pilot control value for the nominal speed 201 via a PI controller, the switch S8 and the bypass actuating member.

At the same time, the actual value of the air intake rate 60 is subtracted from the air-rate pilot control value 301 at the summing point 302 and fed to the switch S7 via the summing point 303. The switch S7 for the basic air matching closes when the following four conditions are satisfied: starting is completed, an inaction time set during the closing of the main throttle flap has elapsed and the pilot control values are constant. Secondly, the engine speed must be within a certain band width or the actual value of the air intake rate must be lower than the output value of the summing point 302 minus the output signal of the integrator 304 (which stores the basic air matching values). Furthermore, in manual-shift vehicles, vehicle speed v must be equal to zero or, in automatic vehicles, the selector lever must be in the neutral position. The last condition for the closing of the switch S7 is that a speed plausibility monitoring must emit a clearance signal.

A plausibility test is conducted for the speed signal. If no pulses occur within a predetermined period of time above a load threshold and engine-speed threshold, the store for an implausible speed signal is set and can no longer be erased until the ignition is switched off. If pulses above the thresholds are detected and the storage cell for an implausible speed signal is not set, the plausibility monitoring emits a signal for plausible measured values.

From the switch S7, the signal is fed to the input of the integrator 304 for the basic air matching. The output of the integrator is fed subtractively to the summing point 303 via the limiter 305. In the detected idling case, that is to say when the switch S7 is closed, the output of the integrator changes until the output value of the integrator is equal to the difference between the air-rate pilot control value 301 and the actual value 60 of the air intake rate. A particular feature of the integrator is that positive input signals are integrated more slowly than negative input signals. Matching errors, which can arise, for example, as a result of a constantly locked power-assisted steering, can thereby largely be avoided. On the other hand, the faster negative integration makes it possible for the initial matching value, selected high at the start for safety reasons, to be returned to the correct value quickly. Furthermore, the difference value of the summing point 302 is fed to the summing point 306. Moreover, the content of the integrator 304 is fed subtractively to the addition point 306. Via the switch S4, the summation result of the point 306 can be fed to the I-element 204 of the speed controller. The overrun-air switch S4 closes when the following five conditions are satisfied: starting must be completed and the throttle flap closed. Furthermore, the accelerator pedal must be in the position of rest and the associated microswitch closed. The fourth condition is that the measured actual air mass must be lower than the maximum possible air throughput rate at the idling adjuster or the inaction time set during the closing of the main throttle flap must have elapsed. The last condition is that, in automatic vehicles, the drive must be engaged by the selector lever or the vehicle is of the manual-shift type. The common use of the I-element 204 for the idling speed control and the overrun-air rate control ensures smooth transitions between the two types of control. Furthermore, the difference signal of the summing point 210 between the pilot control value for the nominal speed and the actual speed value is fed to the summing point 306 via the switch S5 and the limiter 307. The switch S5 closes as soon as the actual speed falls below the pilot control value for the nominal speed and consequently transfers a speed fraction to the overrun air control. The result of this is a starting aid. Consequently, the signal must be limited to a lower value in vehicles with a manual gear shift than in automatic-transmission vehicles. Furthermore, the summarizing point 306 also receives a speed-dependent signal 70 via the overrun-air characteristic, an additional signal 80 if the vehicle speed is not equal to zero, in order to satisfy the energy requirement for a power-assisted steering if used, and finally an additional nominal-value signal 90 for the overrun-air control in the overrun cut off mode.

Finally, all the control values are fed to the addition point 307 and from there, via the switch S8, to the engine power adjusting-member drive. During the starting phase, the switch S8 is opened. Thus, in the preferred exemplary embodiment, at the same time the bypass air flap is opened to a value of 95% of the maximum throughput rate. After the starting phase, the switch S8 closes.

Figure 2:
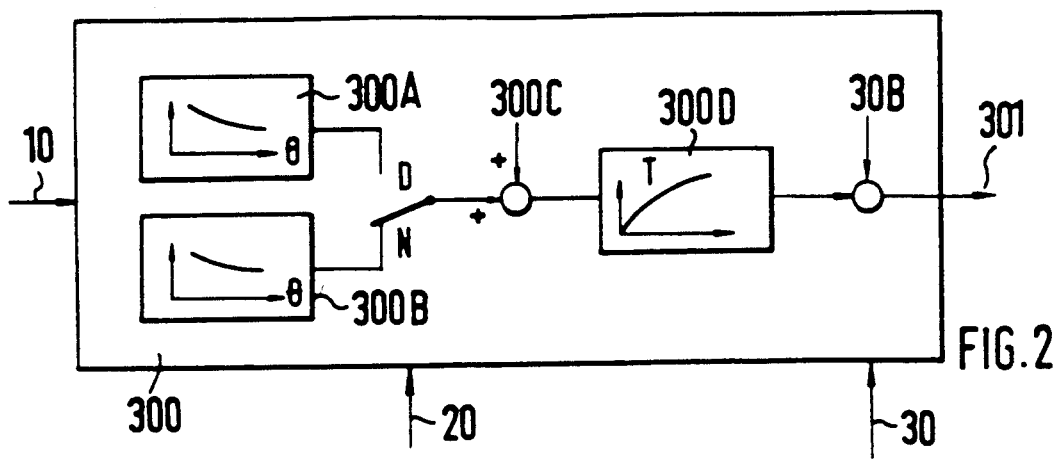

FIG. 2 shows the acquisition of the air-rate pilot control value 301 in the air-rate pilot control 300. By means of a temperature interpolation, as a function of the gear position, a pilot control value for the air throughput is calculated 300A or 300B. When a driving stage is selected, there is a single additional air-rate cut-in 300C which is cut back in time via the following filter 300D. The air-conditioning system operating signal 30B is then added, in order thereby to obtain the air-rate pilot control value 301.

Figure 3:
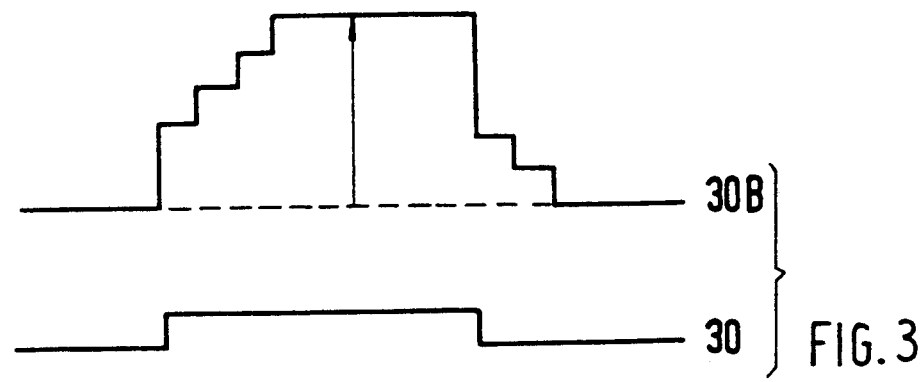

FIG. 3 shows the time curve of the compensation of the air-rate requirement for the air-conditioning system against time. The curve 30 represents the switching signal of the air-conditioning system switch. The curve above it shows the time behaviour of the compensation signal 30B for the air-conditioning system. When the air-conditioning system is switched on, the correction value is set in a jump to a fraction of the maximum addition and is subsequently increased to the maximum value by means of a ramp or staircase-like function. The maximum value can be selected differently as a function of the gear position. When the air-conditioning system is switched off, there is first likewise a jump to a preselected fraction of the maximum addition and subsequently a ramp-shaped cutback to the value zero.

Figure 4:
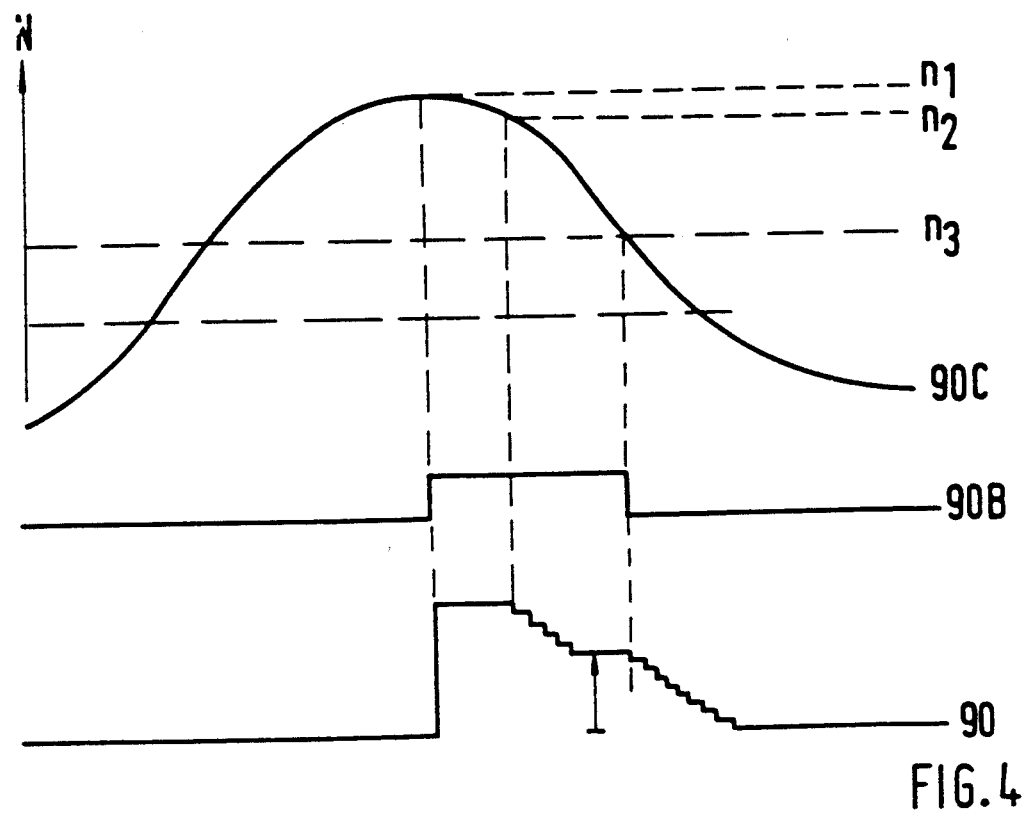

FIG. 4 shows the formation of the nominal-value addition in the overrun-air control and a simultaneous overrun cut off. The uppermost curve 90C represents the overrun cut off signal. The lowest curve represents the desired-value addition 90. The speed maximum $n_1$ is followed in time by the overrun mode. The overrun cut off signal 90B is thus outputted until a restoration speed $n_3$ is reached. Simultaneously with the appearance of the overrun cut off signal, the desired-value addition 90 is set at a maximum value. When the engine speed falls below a speed threshold $n_2$, this value is cut back by means of a time grid to a residual value dependent on the nominal speed (from the engine-speed pilot control). The residual value is cut back only after the end of the overrun cut off (pick up with a sharp speed drop).

Figure 5A:
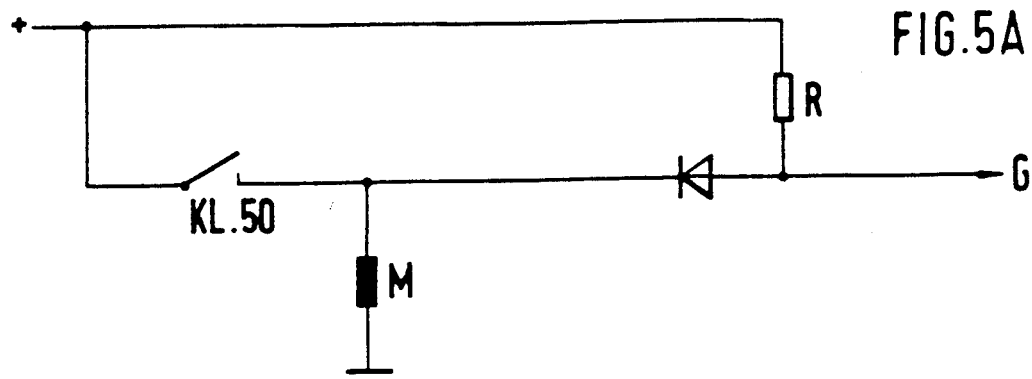
Figure 5B:
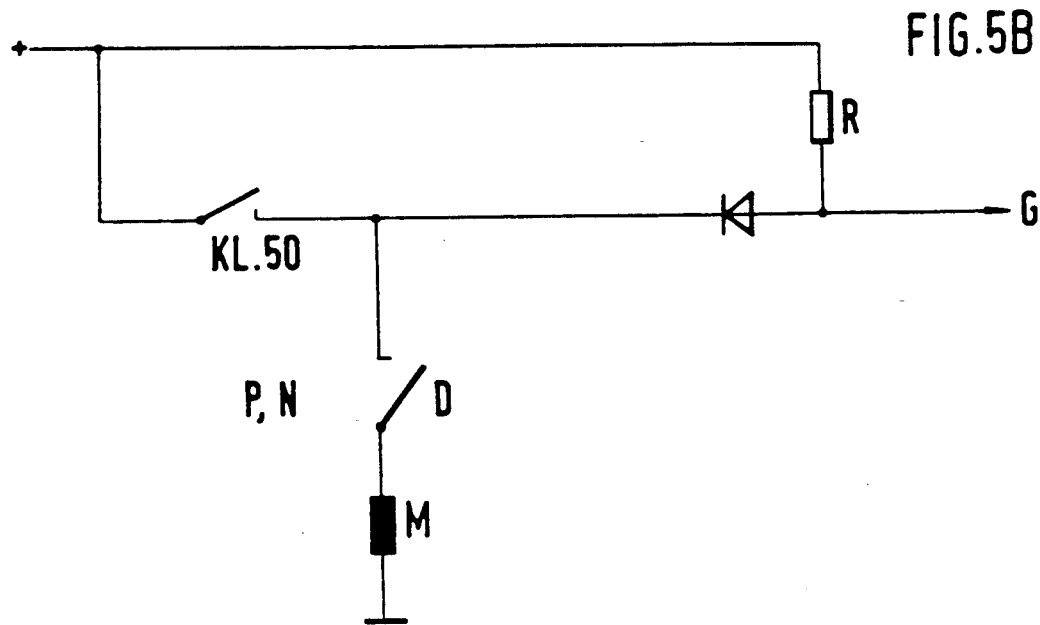

At various points of the control circuit, it is necessary to have information as to whether the vehicle is an automatic-transmission or a manual-shift vehicle. In the exemplary embodiment, the circuit for automatic detection, indicated in FIGS. 5A and 5B, is used. The starter-circuit version for a manual-shift vehicle can be seen at the top of FIG. 5A, while the lower circuit arrangement 5B refers to an automatic-transmission vehicle. The terminal 50 (K1 50) represents the starter switch and the winding of the starter relay is designated by M. The circuit is completed by the pull-up resistor R and a decoupling diode. In an automatic-transmission vehicle there is an additional switch which is closed in the selector-lever positions P, N and which is opened in the drive position. The output signal G is used for detecting the transmission type. During motoring, in the manual-shift vehicle earth potential is applied to the output G, while in the automatic-transmission vehicle a positive potential is applied to the output G. This signal is used for detecting the transmission type.

Figure 6:
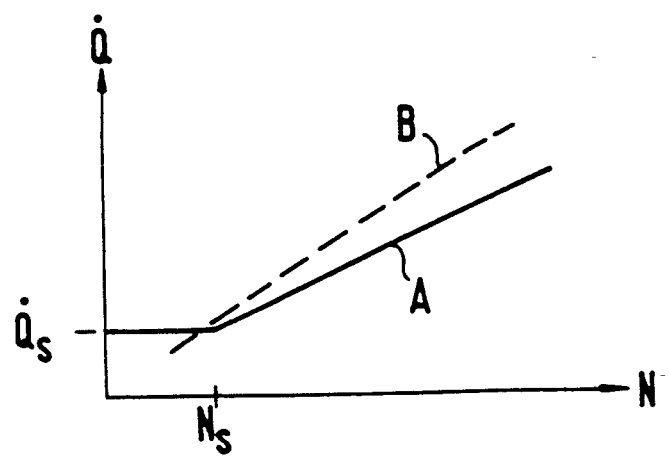

FIG. 6 shows diagrammatically the overrun-air characteristic. The engine speed is plotted on the X axis and the air mass per unit time on the Y axis. The curve B represents the air requirement for static engine running. The curve A shows the overrun-air characteristic. $N_s$ represents the nominal speed, while $Q_s$ is the associated air rate.

The process according to the invention and a device for carrying out the process according to the invention can take the form of either an analogue circuit with a more or less high degree of integration or a digital or computer circuit with a differing degree of integration. Solutions using a microprocessor or mixtures of the digital and analogue forms are also possible.

It should also be mentioned that the exemplary embodiment relates to an engine with a main and a bypass throttle flap. However, the process according to the invention can also be used on internal-combustion engines with only one throttle flap.

Furthermore, in the process and the corresponding device, the air-rate meter can also be replaced by an air-mass meter.

We claim:

1. Process for air proportioning during idling and overrun modes of operation of an internal combustion engine of a motor vehicle including means for electrically controlling an engine-power adjusting member, comprising the steps of
measuring the air intake rate of the engine;
determining a preliminary air rate control value in dependency on temperature, drive gear position and air conditioning state of the vehicle;
detecting the occurrence of the idling mode of engine operating and, during the idling phase, regulating the engine speed to a nominal value;
storing the difference of the air intake rate value measured at the regulated nominal engine speed and the preliminary air rate control value; and, during the overrun phase of the engine, adjusting the intake air rate according to the stored difference value.

2. Processing according to claim 1, characterized in that the intake air rate is corrected during overrun by means of the preliminary control values, and the stored air-rate value is corrected by means of the preliminary control values.

3. Process according to claim 1, characterized in that the stored air-rate value is limited to a maximum and/or a minimum.

4. Process according to claim 1, characterized in that storing takes place in an integrator.

5. Process according to claim 1, characterized in that the integration speed of the integrator, that is the rate of change of the resulting integral with a constant input signal, is dependent on the sign of the input signal.

6. Process according to claim 5, characterized in that the integration speed is higher for a negative input signal than for a positive input signal.

7. Process according to claim 1, characterized in that, during overrun, the stored air-rate value is supplemented via the deceleration-air characteristic as a function of the engine speed.

8. Process according to claim 1, characterized in that, when the vehicle is in motion, a fixed nominal amount is added to the overrun air for variable additional loads, especially the power-assisted steering.

9. Process according to claim 1, characterized in that a further fixed amount is added to the overrun air during the activation of the fuel cut off and, when the engine speed falls below a speed threshold between the fuel cut off speed and the restoration speed, is regulated to a fixed value originating from a preliminary engine-speed control and dependent on the nominal speed.

10. Process according to claim 1, characterized in that the overrun-air rate has added to it a limited engine-speed negative feedback value, the maximum of which is dependent on whether the vehicle has an automatic-transmission or a manual-shift vehicle.

11. Process according to claim 1, characterized in that the preliminary control value for the air rate is generated smoothly, at least as a function of temperature, transmission or gear-lever position, via a timing element and thereafter as a function of at least one air-conditioning system operating signal.

12. Process according to claim 11, characterized in that the switching on or off of at least the air-conditioning system operating signal takes place at least partially according to a stepped characteristic.

13. Process according to claim 1, characterized in that the preliminary control value for the idling speed is formed at least as a function of the parameters of temperature or gear-lever position and a multiplicative increase, when the actual speed is significantly higher than the nominal speed from at least the two parameters, and furthermore at least one air-conditioning system operating signal and a following timing filter for smooth transitions, the time constant of which can be controlled at least as a function of the starting signal and the overrun cut off signal.

14. Process according to claim 13, characterized in that the air-conditioning system operating signal is linked to a gear lever position signal which gives a lower limitation of the nominal speed.

15. Process according to claim 1, characterized in that the nominal idling speed value minus the actual speed value during idling is fed to the controlling means for the engine-power adjusting member via at least one P-element and on I-element.

16. Process according to claim 15, characterized in that the nominal overrun-air value is fed to the controlling means for the engine-power adjusting member during overrun via at least one integrator.

17. Process according to claim 16, characterized in that the engine power adjusting member is controlled from the idling-speed control during idling and from the overrun-air control during overrun via the same integrator, by feeding to the integrator input one of the control variables or a zero signal, depending on the particular operating mode, so that a smooth transition is guaranteed during transition from one operating mode to the other.

18. Process according to claim 1, characterized in that the preliminary control value for the air rate is fed constantly to the controlling means for the engine power adjusting member and, in the event of a vehicle speed higher than zero, together with the preliminary control value for the air rate additional engine speed value derived from an overrun air characteristic is fed to the controlling means for the adjusting member.

19. Process according to claim 18, characterized in that an air mass is used instead of the air rate.

20. Process according to claim 10, characterized in that, to detect the transmission type, the electrical potential at the starter switch (K1 50) is tapped and discriminated on the side remote from the battery.

21. Process according to claim 20, characterized in that, in vehicles with a manual gear shift, the engine-speed negative feedback value is limited to lower values than in automatic-transmission vehicles.

22. Device for air proportioning during idling- and overrun modes of operation of an internal combustion engine of a motor vehicle having means for electrically controlling an engine-power adjusting member, comprising inputs for signals corresponding to actual speed, actual air intake, idling phase, overrun phase, drive gear position, air conditioning state of the vehicle and temperature; and means for engine-speed control, comprising means for producing a preliminary air intake rate control signal in dependency on the temperature- drive gear position- and the air conditioning state signals;

means for regulating the engine speed to a nominal idling speed value when an idling phase is detected;

means for storing the difference of the actual air intake rate during the nominal idling speed and the preliminary air intake rate control signal; and means for adjusting the air intake rate according to the stored difference of the air intake rate when an overrun phase is detected.

23. Device according to claim 22, characterized in that the idling speed regulating means and the overrun-air intake adjusting means is carried out by means of a single integration-controller.

* * * * *